United States Patent
Hoetzer et al.

(10) Patent No.: US 10,402,740 B2
(45) Date of Patent: Sep. 3, 2019

(54) NATURAL INTERACTIVE USER INTERFACE USING ARTIFICIAL INTELLIGENCE AND FREEFORM INPUT

(71) Applicant: SAP SE, Walldorf (DE)

(72) Inventors: Judith Hoetzer, Sulzfeld (DE); Philip Miseldine, Karlsruhe (DE)

(73) Assignee: SAP SE, Walldorf (DE)

( * ) Notice: Subject to any disclaimer, the term of this patent is extended or adjusted under 35 U.S.C. 154(b) by 12 days.

(21) Appl. No.: 15/223,991

(22) Filed: Jul. 29, 2016

(65) Prior Publication Data

US 2018/0032505 A1 Feb. 1, 2018

(51) Int. Cl.

| | |
|---|---|
| H03M 7/30 | (2006.01) |
| H04N 1/00 | (2006.01) |
| G06N 7/00 | (2006.01) |
| G06N 20/00 | (2019.01) |
| G06F 3/00 | (2006.01) |
| G06F 17/27 | (2006.01) |
| G06Q 40/08 | (2012.01) |
| G06Q 10/10 | (2012.01) |
| G06F 16/33 | (2019.01) |

(Continued)

(52) U.S. Cl.
CPC ............... G06N 7/005 (2013.01); G06F 3/00 (2013.01); G06F 16/3338 (2019.01); G06F 17/277 (2013.01); G06F 17/2785 (2013.01); G06N 20/00 (2019.01); G06Q 10/10 (2013.01); G06Q 40/08 (2013.01); G06F 3/0482 (2013.01); G06F 3/0483 (2013.01); G06F 3/0484 (2013.01); G06F 3/04842 (2013.01); G06F 3/04883 (2013.01); G06F 3/04886 (2013.01); G06F 17/211 (2013.01); G06F 17/22 (2013.01); G06F 17/242 (2013.01); G06F 17/243 (2013.01); G06F 17/2765 (2013.01)

(58) Field of Classification Search
CPC ............... G06F 17/2765; G06F 17/242; G06F 3/04883; G06N 7/005; G06N 99/005
USPC .......................................................... 715/268
See application file for complete search history.

(56) References Cited

U.S. PATENT DOCUMENTS

| | | | | |
|---|---|---|---|---|
| 5,933,526 A | * | 8/1999 | Sklarew | .................. G06F 3/033 382/189 |
| 6,427,063 B1 | * | 7/2002 | Cook | ...................... G09B 7/00 434/118 |

(Continued)

Primary Examiner — Cesar B Paula
Assistant Examiner — Luu-Phuong T Nguyen
(74) Attorney, Agent, or Firm — Schwegman Lundberg & Woessner, P.A.

(57) ABSTRACT

In an example embodiment, first user input including handwriting input and non-alphanumeric symbolic input is detected. The non-alphanumeric symbolic input is input into a first machine learning model trained to output a set of possible actions corresponding to the non-alphanumeric symbolic input and a probability score assigned to each action in the set of possible actions. A combination of the action having the highest probability score and textual input from the handwriting input is input into a second machine learning model trained to select a service from a plurality of services based on the textual input and the selected action by referencing a service model corresponding to each service in the plurality of services. The combination of the textual input and the selected action is transformed into a native request for the selected service based on the service model for the selected service.

20 Claims, 14 Drawing Sheets

(51) Int. Cl.
*G06F 3/0484* (2013.01)
*G06F 17/22* (2006.01)
*G06F 3/0482* (2013.01)
*G06F 17/24* (2006.01)
*G06F 3/0488* (2013.01)
*G06F 17/21* (2006.01)
*G06F 3/0483* (2013.01)

(56) References Cited

U.S. PATENT DOCUMENTS

| | | | |
|---|---|---|---|
| 9,966,065 B2* | 5/2018 | Gruber | G06F 17/2705 |
| 2002/0083025 A1* | 6/2002 | Robarts | G06F 1/163 |
| | | | 706/12 |
| 2005/0038766 A1* | 2/2005 | Bantz | G06F 17/30067 |
| 2006/0018546 A1* | 1/2006 | Lagardere | G06F 3/04883 |
| | | | 382/186 |
| 2007/0098263 A1* | 5/2007 | Furukawa | G06F 3/03545 |
| | | | 382/181 |
| 2012/0287089 A1* | 11/2012 | Shiota | G06F 3/03545 |
| | | | 345/179 |
| 2014/0019905 A1* | 1/2014 | Kim | G06F 9/451 |
| | | | 715/780 |
| 2014/0143721 A1* | 5/2014 | Suzuki | G06F 3/04842 |
| | | | 715/810 |
| 2014/0361983 A1* | 12/2014 | Dolfing | G06F 3/04883 |
| | | | 345/156 |
| 2015/0067485 A1* | 3/2015 | Kim | G06F 17/2264 |
| | | | 715/256 |
| 2016/0196499 A1* | 7/2016 | Khan | G06N 5/048 |
| | | | 706/52 |
| 2017/0017519 A1* | 1/2017 | Khan | G06F 9/4881 |
| 2017/0109032 A1* | 4/2017 | Melinand | G06F 3/04817 |

* cited by examiner

NATURAL INTERACTIVE USER INTERFACE USING ARTIFICIAL INTELLIGENCE AND FREEFORM INPUT

TECHNICAL FIELD

This document generally relates to systems and methods for graphical user interfaces in computer systems. More specifically, this document relates to a natural interactive user interface using artificial intelligence and freeform input.

BACKGROUND

Graphical user interfaces (GUIs) allow users to interact with electronic devices, such as computers and mobile devices, through graphical icons and visual indicators, as opposed to text-based interfaces, which rely on typed command labels or text navigation. GUIs have traditionally relied on a combination of navigation-based input, such as through the use of computer mice, trackpads, etc., and text-based input through keyboards.

In recent years, voice recognition technology has improved to the point where interaction with electronic devices using voice is now a credible alternative to navigation-based and text-based input. As devices get smaller and smaller and voice-based input becomes more and more prevalent, there has been a movement away from direct interaction with an electronic device using one's own hands and fingers. There are a number of people, however, who long for the day when using a pen or pencil and paper was the predominant way to communicate. Additionally, there are still certain types of actions in a user interface that are easier for humans to communicate using more freeform methods of expression, such as combinations of text and drawings, that are not possible using existing GUIs.

BRIEF DESCRIPTION OF DRAWINGS

The present disclosure is illustrated by way of example and not limitation in the figures of the accompanying drawings, in which like reference numbers indicate similar elements and in which.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a GUI is provided that permits freeform input, using a combination of handwriting input and symbolic input, using an artificial intelligence (AI) engine that learns what various combinations of textual and symbolic input mean. This allows users to combine drawing and writing to provide a richer mechanism to interact with data than do traditional techniques.

Throughout history, paper has always supported a plethora of different ways to communicate information, providing a natural humanistic interface for users. In an example embodiment, an electronic notepad is utilized to gain the benefits of communication via paper in the digital world. Notes entered into the electronic notepad can represent conversations, intentions, and desires, and symbols, or even doodles, can enrich content with importance, priority, and metadata. For the purpose of this disclosure, the electronic notepad may be termed a "MagicPad."

Figure 1:
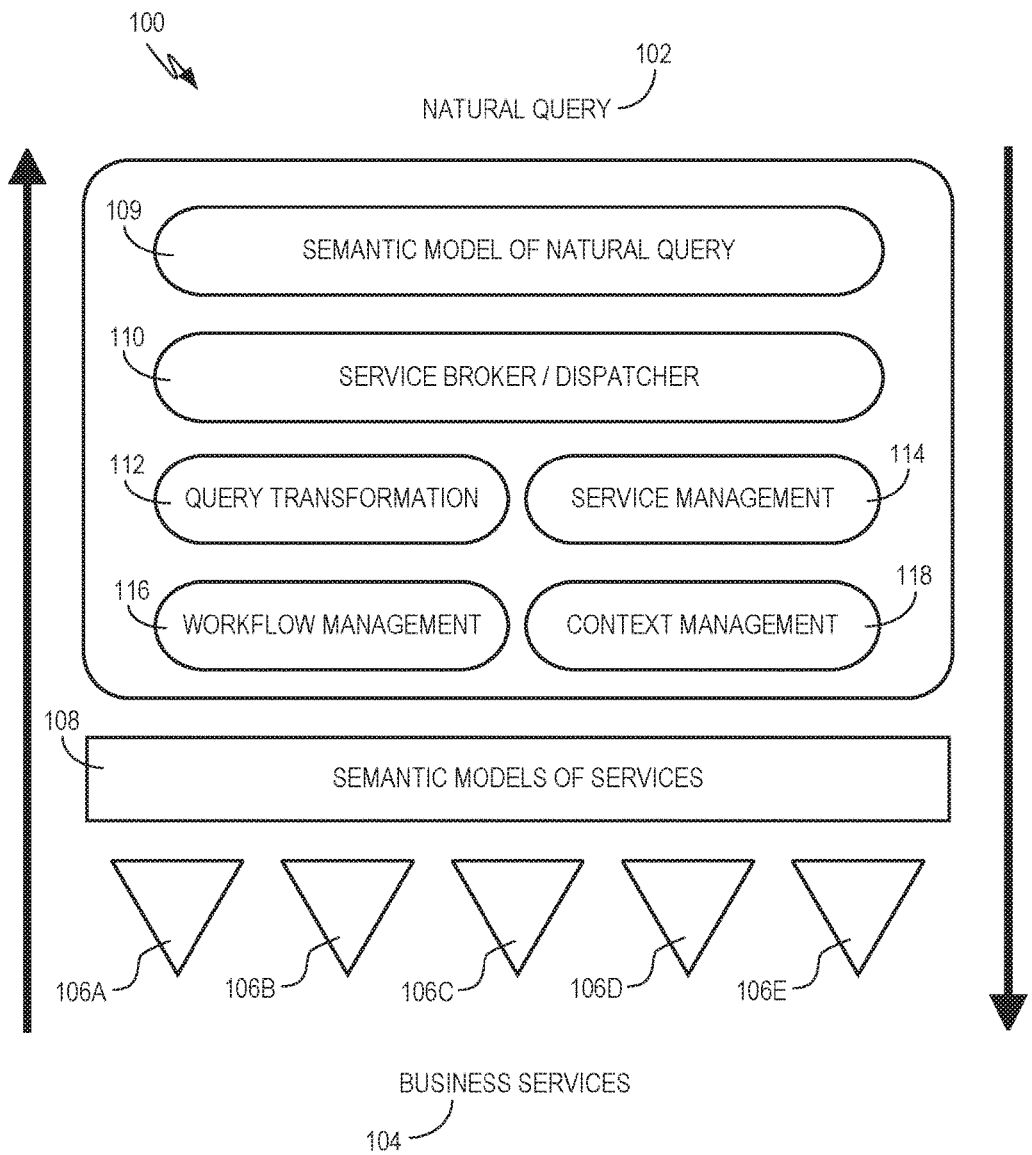
FIG. 1 is a block diagram illustrating a system, in accordance with an example embodiment, of using artificial intelligence to analyze a combination of handwritten text and symbolic information for input into a GUI.

FIG. 1 is a block diagram illustrating a system 100, in accordance with an example embodiment, of using AI to analyze a combination of handwritten text and symbolic information for input into a GUI. A natural query 102, also known as a natural language query, may include handwritten text and symbolic input. On the other end of the system 100 are one or more services 104, each accessible via a service interface 106A-106E. Each service 104 may have a corresponding semantic model of service 108. The semantic model includes a description of how the corresponding service is used, its domain, and its construction. Using each of these models, a machine-based learning classifier may be trained that matches natural queries 102 to the relevant parts of the service interfaces 106A-106E. In an example embodiment, the machine-based learning classifier is a neural network-based classifier.

For instance, consider a service that exposes sales orders. This service may have two methods:

getAllSalesOrders( ) // retrieves all sales orders; and
   getIndividualSalesOrder(int ID) //retrieves a particular sales order from a given ID Now consider that this service has associated documentation that explains each part of its interface (shown above as the comment on each method). By training a Bayes Classifier-based neural network, with inputs to the natural language statements, and the output as an addressable part of the service interface, a natural language model of the service can be created.

The model can then classify natural language queries with a degree of probabilities. For example, consider the simple case of a purely text-based input as follows:

Show me all the sales orders

This is a modified form of the first service interface description ("retrieves all sales orders"). The model may then return a high probability that getAllSalesOrders( ) can service the request, based on the documentation used to train it, as follows:

Input: Show me my sales orders
   Output: getAllSalesOrders( ); probability: 0.87777
      getIndividualSalesOrder(int ID); probability: 0.12223

The models can be serialized and used to predict the capability of a given service to service a given natural query 102.

Variations of the documentation can also be derived using natural language techniques. For example, synonyms of each word given in a documentation statement can be provided to expand each statement into a multitude of variants that can further train the network. For example, the original statement "retrieves all sales orders" can be expanded to:

Display all sales orders
   Show all sales orders
   Fetch all sales orders
   Bring all sales orders
   Bring every sales order Semantic analysis of the statements ensures that such expansions are only valid for verbs and tokens that are not nouns, which could misconstrue domain knowledge (for example, expanding sales orders to purchase commitments), although in some example embodiments listings of "safe" synonyms may be maintained to permit some variation in the input of nouns.

The above example, of course, assumes that the natural query 102 is already in a text-based format readily understandable by the system 100. In an example embodiment, handwriting analysis may be used to convert text-based handwriting input into a textual query. Furthermore, and perhaps more complexly, in an example embodiment non-language human inputs, such as drawings, symbols, doodles, gestures, etc., can be mapped to a language-based query using machine learning techniques, so that they can be mapped to the services 104 as well.

In an example embodiment, a natural query 102 can be tokenized, expanded, and restructured to provide intent-based sentence structures. This may be performed using a natural query model to derive a semantic model of the natural query 109. The natural query model may be trained using a Bayes Classifier-based neural network, with inputs to the natural query, and the output as a text-based query.

A service broker/dispatcher 110 may then discover to which of the services 104 the natural query 102 should be directed. A query transformation component 112 may then transform the natural query 102 into a form recognizable by the corresponding service 104, using a service management component 114. A workflow management component 116 and a context management component 118 may also be used to perform the query transformation. The result is a transformed query in a native format for the corresponding service 104, which can be acted upon and responded to by the corresponding service 104.

Figure 2:
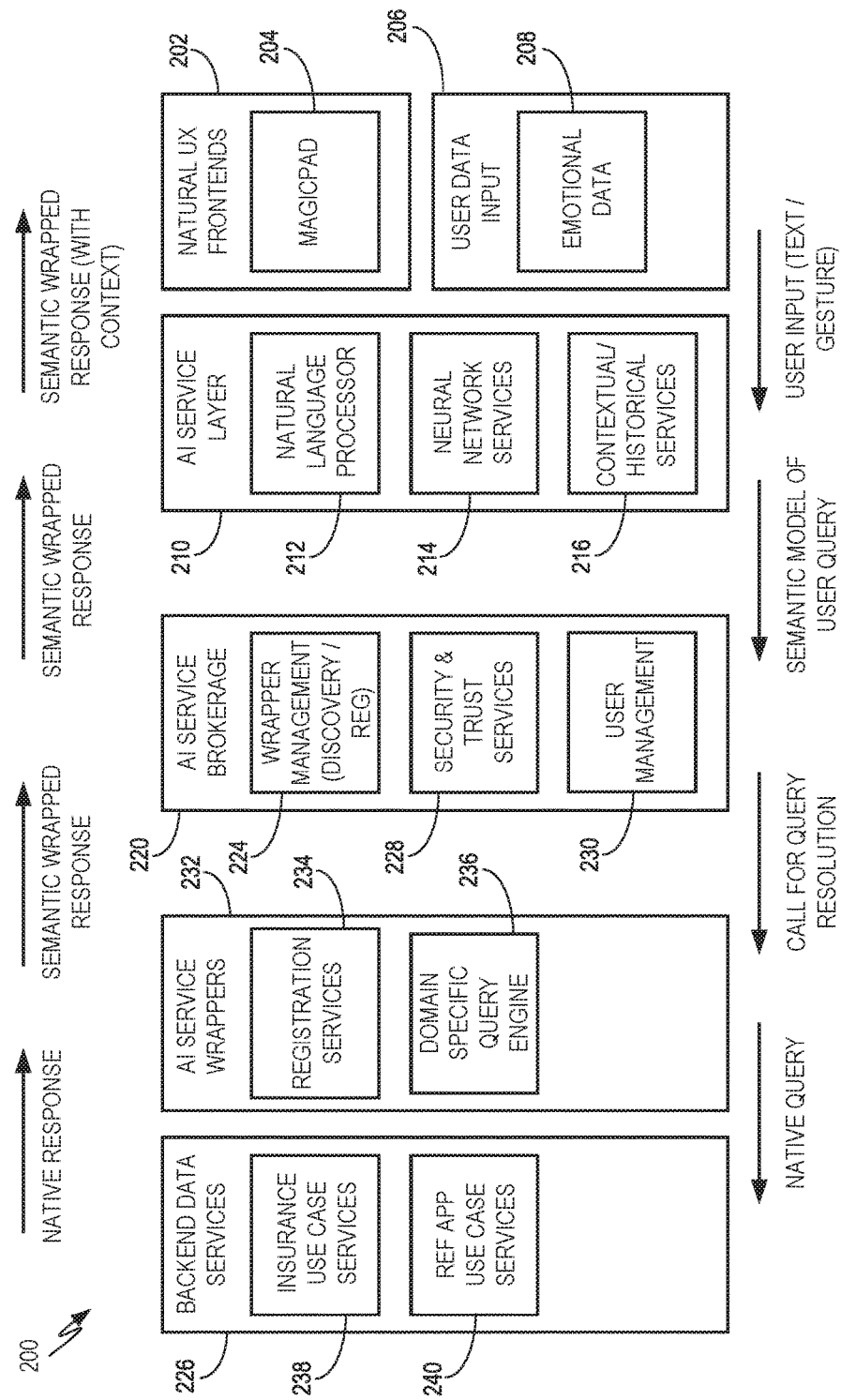
FIG. 2 is an interaction diagram illustrating a process flow for using artificial intelligence to analyze a combination of handwritten text and symbolic information for input into a GUI, in accordance with an example embodiment.

FIG. 2 is an interaction diagram illustrating a process flow 200 for using AI to analyze a combination of handwritten text and symbolic information for input into a GUI. Beginning with the bottom of the figure, a user input in the form of a text/gesture based combination (gesture encompassing drawings, doodles, symbols, etc.) may be received by a natural user experience frontend 202 such as MagicPad 204. Additional user data inputs 206 may also be received, such as, for example, emotional data 208 from one or more sensors embedded into an electronic device (e.g., pulse sensor) or other sensors (e.g., contextual processing sensor that processes user text such as emails to determine emotion).

Inputs are processed at an AI service layer 210, which may include a natural language processor 212, which acts in conjunction with neural network services 214 and contextual/historical services 216 to derive a semantic model of the user input. The contextual/historical services 216 aid the neural network services 214 in learning what various pieces of input map to in the semantic model. For example, the neural network services 214 may learn from sample data that an arrow drawn next to a city name indicates that generally users who put arrows next to cities wish to travel to that city. However, the contextual/historical services 216 may further modify this by recognizing that the current context of the query indicates that, possibly for this particular user, the arrow next to the city name means something else.

An AI Service Brokerage 220 takes the semantic model of the user query and outputs a call for query resolution to an appropriate AI service wrapper 232. Specifically, the AI Service Brokerage 220 includes a wrapper management module 224, which acts to discover which backend data service 226 will be appropriate to handle the user query (as embodied by the semantic model of the user query), based on the semantic models of services. Specifically, the AI Service Brokerage 220 may tokenize the semantic model of the user query and compare the tokens to the various semantic models of services, which as described earlier with respect to FIG. 1 causes the generation of various probabilities corresponding to the likelihood that particular services are the services to handle the user query. The service with the highest probability for this particular user query will be selected and a call for query resolution may be made to the selected service based on input parameters defined in the semantic model of service for the selected service.

A security and trust services component 228 may additionally perform security/trust related tasks, such as verifying that the user is who he or she claims he or she is and is authorized to perform the particular action being invoked by the service. For example, the user query may indicate that the user wishes to view all sales orders, but the user who submitted the user query may not, in fact, be authorized to view certain sales orders. The security and trust services component 228 may then indicate this to the wrapper management module 224, which may modify the call for query resolution accordingly.

Additionally, a user management component 230 may be used to create and manage user accounts/profiles, which are used by the security and trust services component 228.

The call for query resolution is then sent to one or more AI service wrappers 232 corresponding to the selected service. Specifically, a registration service wrapper 234 may permit actions to various services involving registration, while a domain specific query engine 236 handles the user queries. The output from the AI service wrappers 232 are native queries sent to individual backend data services 226, such as, for example, an insurance use case service 238 and a reference application use case service 240.

An example will now be provided in the context of a use case for an insurance adjuster. Specifically, the insurance adjuster may utilize a MagicPad to receive and edit an insurance claim report. An insurance adjuster may act much like an investigator, determining whether the party making the insurance claim is being truthful. The adjuster is able to make free notes about the case and is prompted with data the system provides to enrich their analysis. The adjuster can create queries by simply marking areas of interest and noting a question using alphanumeric input, symbolic input, or a combination of both. The MagicPad interface can import and correlate data from external data sources, such as mapping data, social media data, car telemetry, etc.

In an example, an insurance claim is submitted from a Peter P. who has crashed his father's black sedan at night. Peter is also suffering from whiplash, which leads to a high claim value in the case of long-term treatment.

Figure 3:
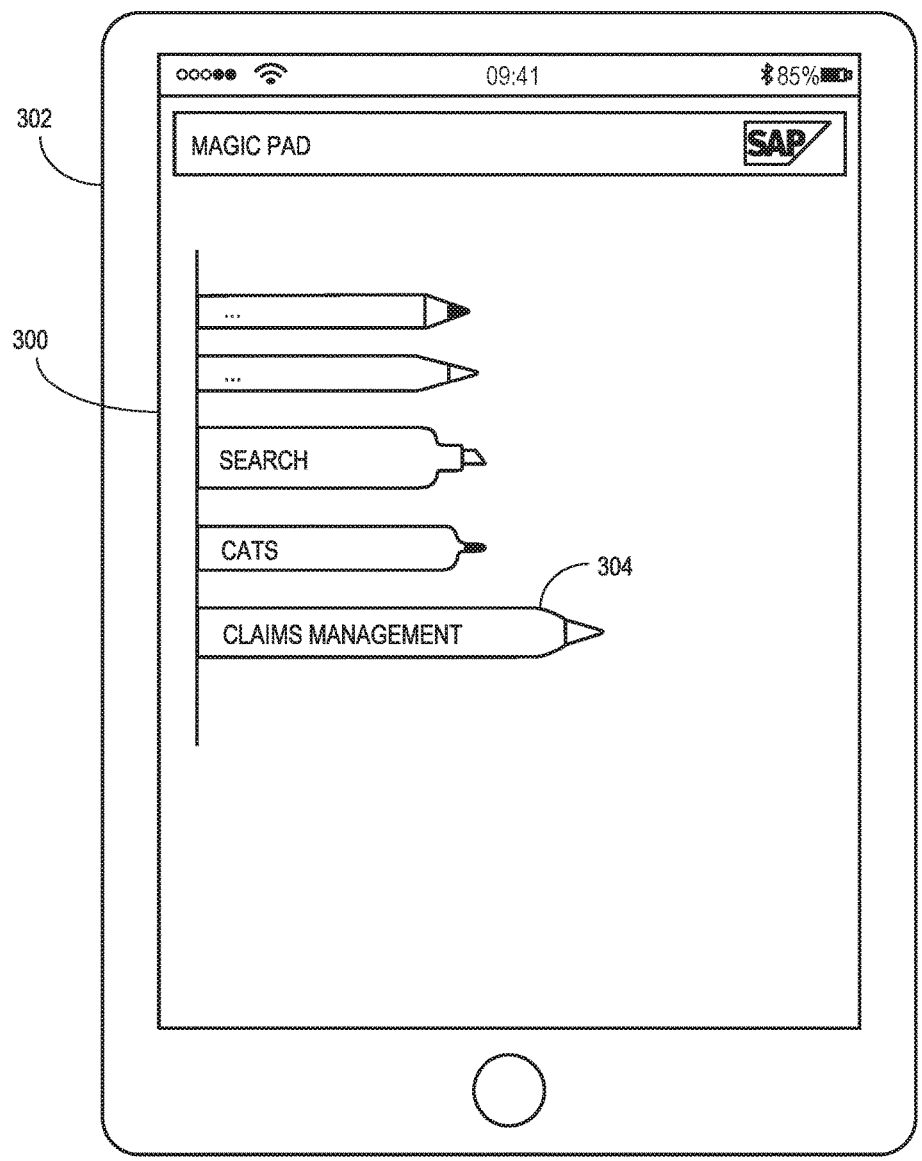
FIG. 3 is a diagram illustrating a MagicPad interface operating on a tablet device, in accordance with an example embodiment.

FIG. 3 is a diagram illustrating a MagicPad interface 300 operating on a tablet device 302 in accordance with an example embodiment. It should be noted that the tablet device 302 may include traditional tablet input technology, such as, for example, a touchpad that is sensitive to a user's finger (allowing the user to write and draw using a finger) or may be designed to be sensitive to a stylus or pen. Other example embodiments are possible using other technology, such as technology where the tablet uses eInk or other technologies to resemble paper.

Figure 4:
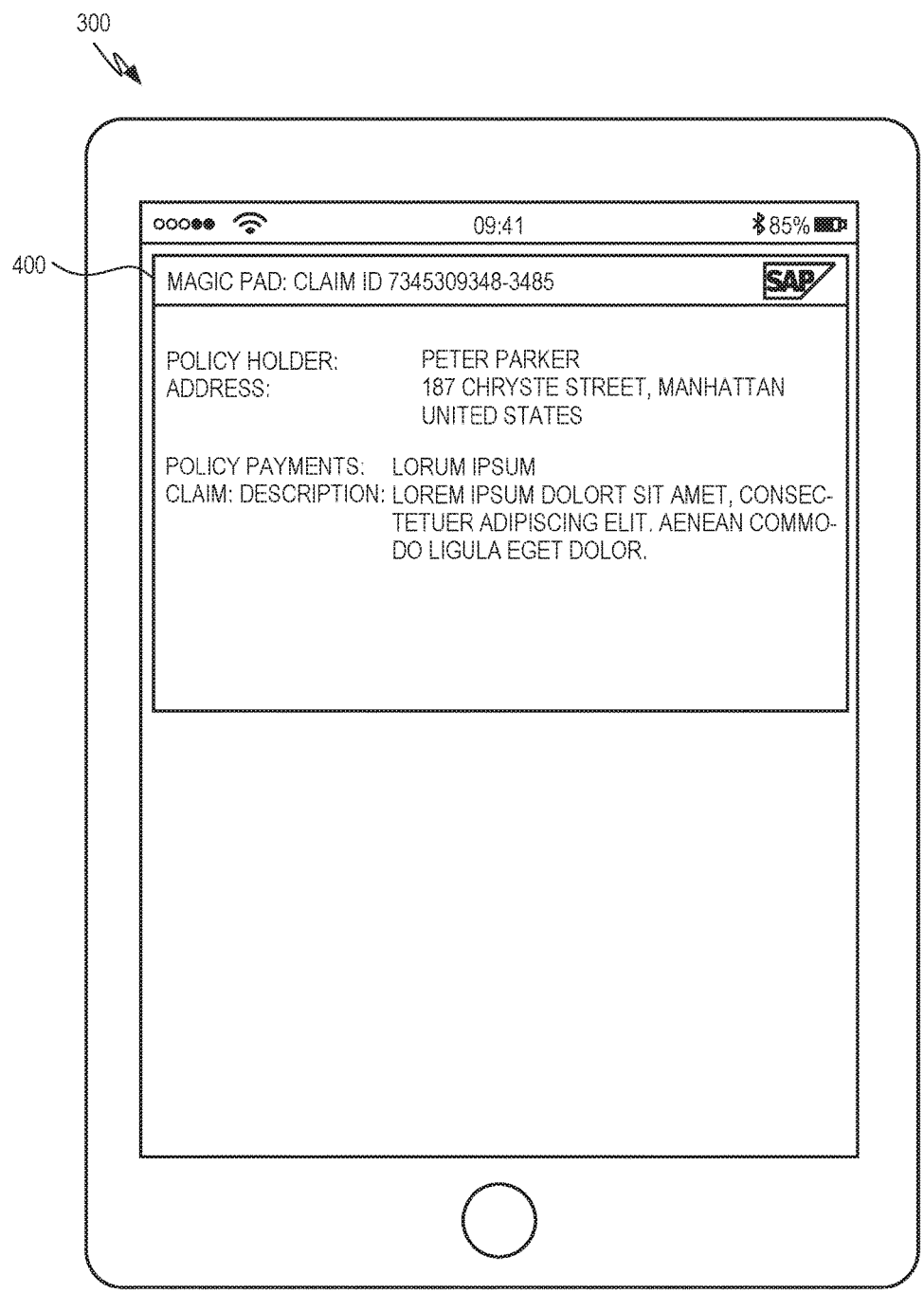
FIG. 4 depicts how the MagicPad interface transitions to a freeform screen where an insurance claim is depicted, in accordance with an example embodiment.
Figure 5:
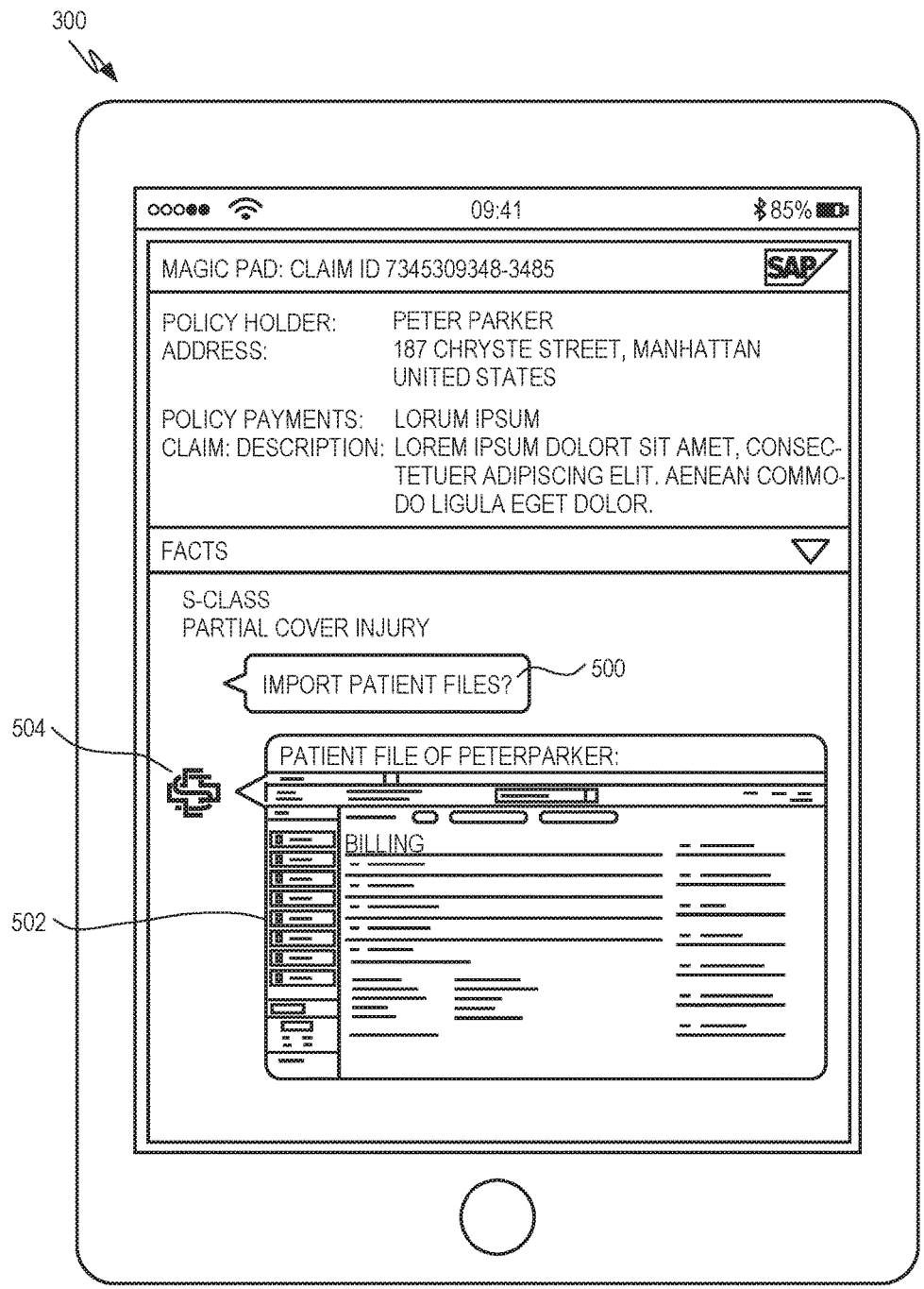
FIG. 5 is a diagram illustrating the MagicPad interface after further input is received, in accordance with an example embodiment.

Here, the insurance adjuster is presented with various choices for selections, including "claims management" 304, which the adjuster selects. FIG. 4 depicts how the MagicPad interface 300 transitions to a freeform screen where an insurance claim 400 is depicted. Notably, there are many pieces of information missing from this claim. FIG. 5 is a diagram illustrating the MagicPad interface 300 after further input is received. Here, the adjuster has handwritten various types of input, including "S-class" (meaning that the claim involves a black sedan automobile), "partial cover" (meaning that the claimant is partially covered), and "injury." While the first two indicate items the adjuster may simply wish to be added to the file, "injury" may provoke a call for further information. Specifically, a box 500 may pop up asking if the adjuster wishes to import a patient file from a healthcare provider, and if the user assents, then the patient file 502 may be imported into the MagicPad interface 300. An icon 504 indicates the source of the information (here a healthcare provider).

Figure 6:
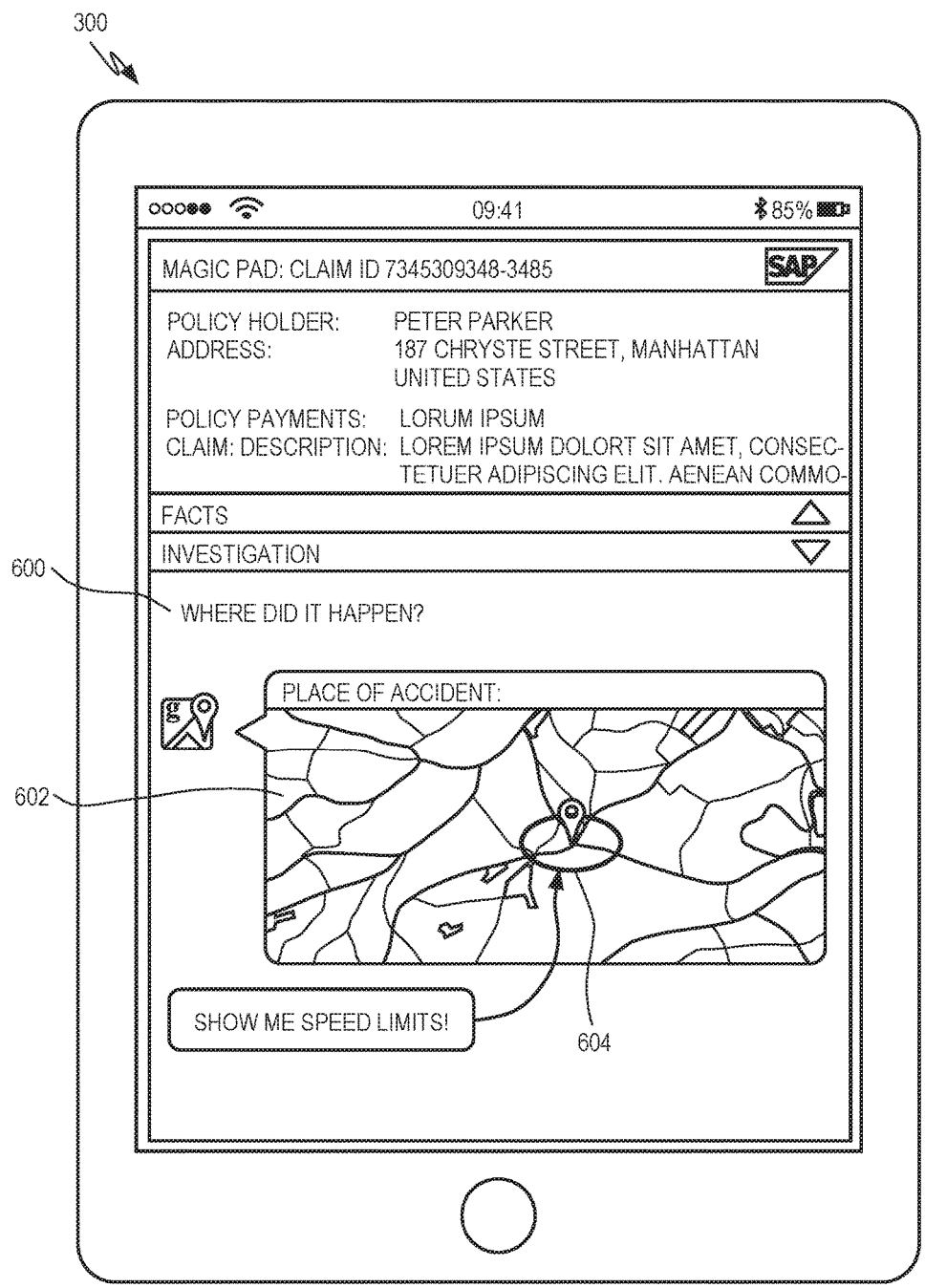
FIG. 6 depicts another screen of the MagicPad interface, in accordance with an example embodiment.

FIG. 6 depicts another screen of the MagicPad interface 300, in accordance with an example embodiment. Here, the user writes, "Where did it happen?" 600. The natural language processor deduces that this means that the user wants to know the geographical location where the accident occurred. This query may be sent first to a service that knows the location where the accident occurred, such as an insurance claim database where a file has been opened for the claim and in which the location where the accident occurred, according to the claimant, is listed. Then, this location may be submitted, for example, to a map database to return a map 602 depicting the location where the accident occurred. This map 602 is then rendered in the MagicPad interface 300 for viewing and interaction by the user.

The user may then interact with the map 602 through the MagicPad interface 300. Specifically, the user draws a circle 604 around an object (here, street) on the map, and also writes, "show me speed limits!" The MagicPad interface 300 may interpret this as meaning that the user wishes to obtain information about the speed limit on the street.

Figure 7:
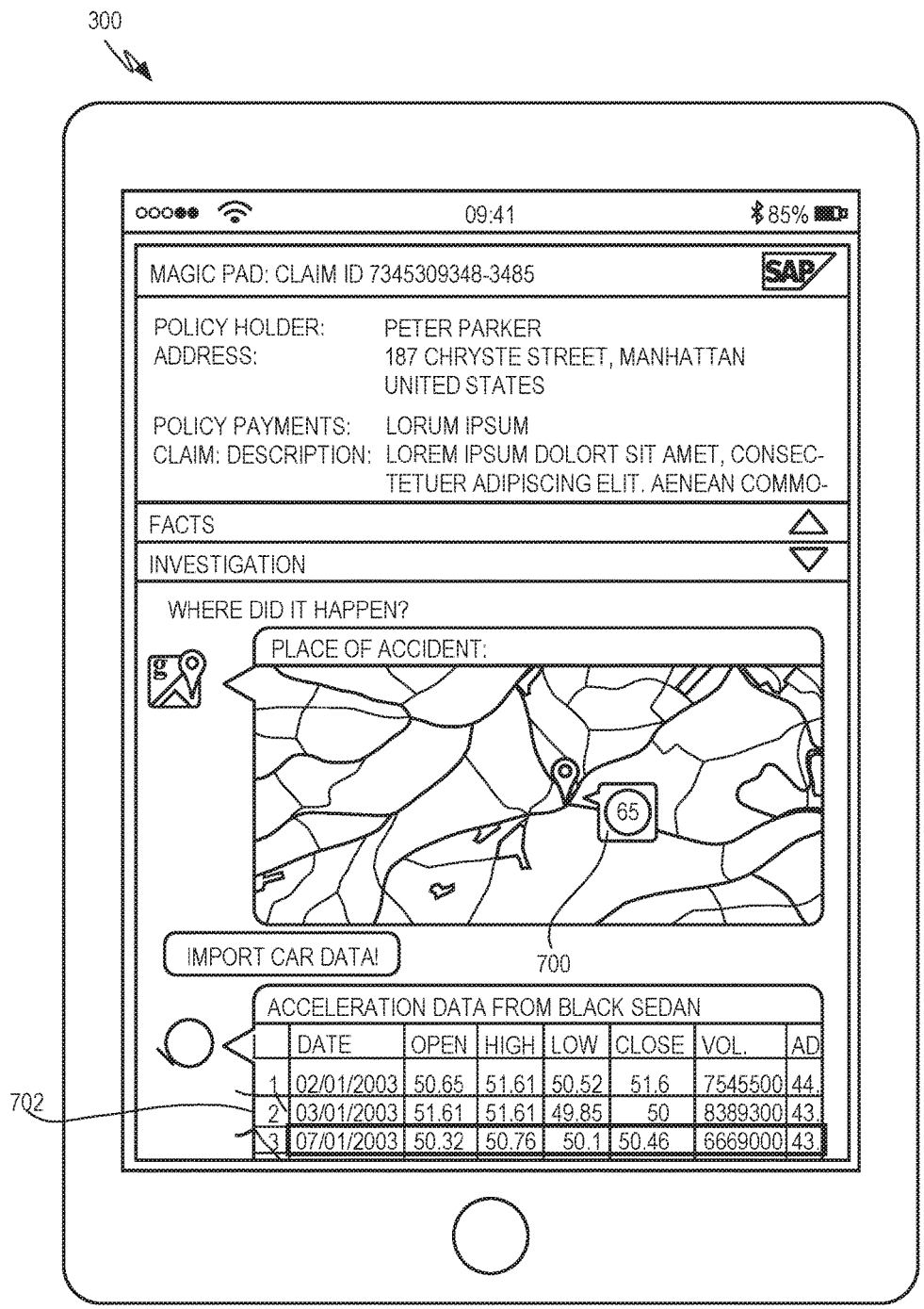
FIG. 7 depicts another screen of the MagicPad interface, in accordance with an example embodiment.

FIG. 7 depicts another screen of the MagicPad interface 300, in accordance with an example embodiment. Here, the speed limit 700 is depicted, in response to which the user writes, "import car data!" The MagicPad interface 300 deduces that acceleration data from a chip in the car should be retrieved and displayed, which is depicted as 702.

Figure 8:
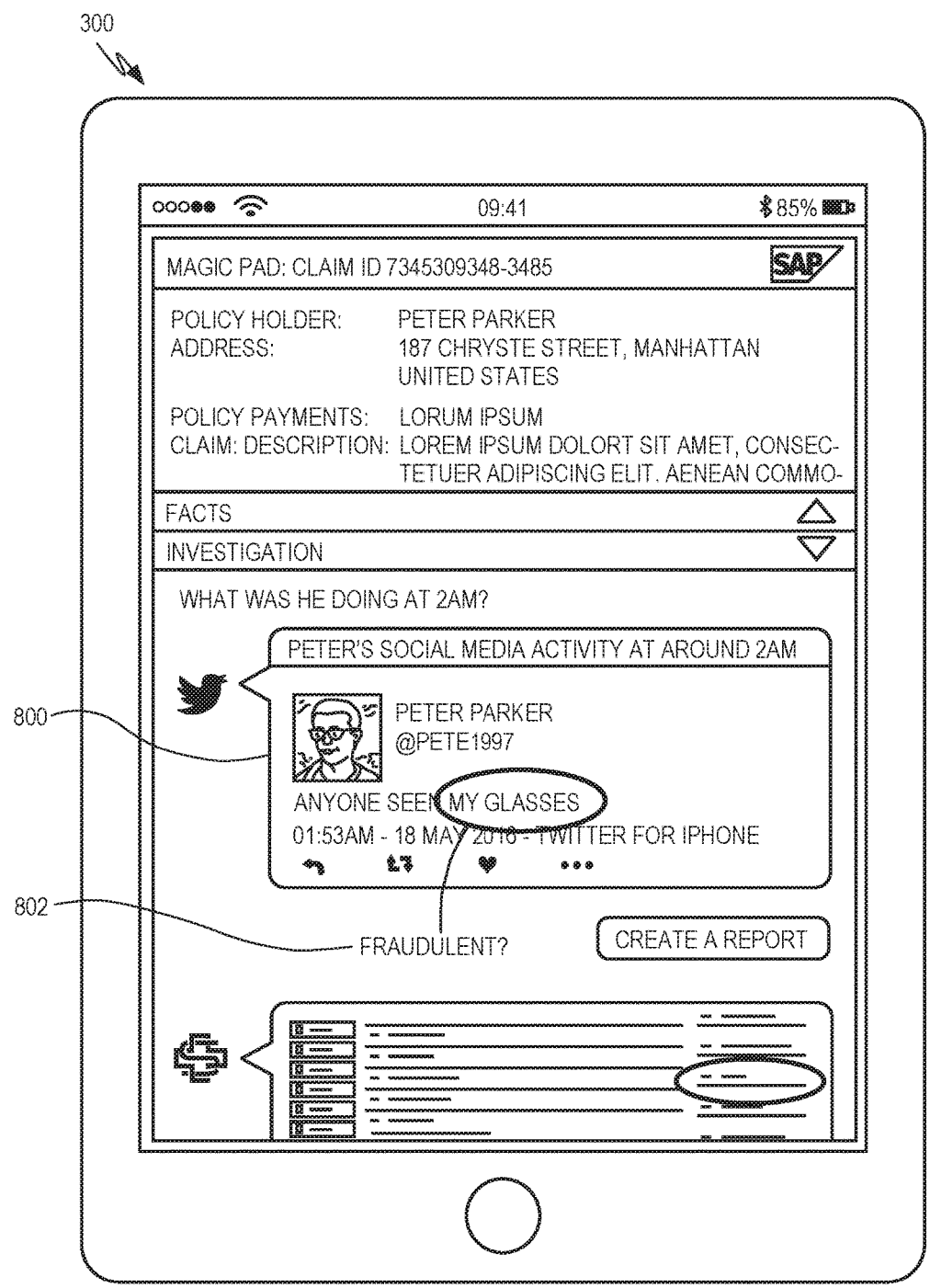
FIG. 8 depicts another screen of the MagicPad interface, in accordance with an example embodiment.

FIG. 8 depicts another screen of the MagicPad interface 300, in accordance with an example embodiment. Here, the user has written, "What was he doing at 2 am?", prompting a query for any online actions taken by Peter subsequent to the accident. A social media post 800 from around that time may be retrieved and displayed. Notably, the social media post 800 describes how Peter has posted the question "Anyone seen my glasses?" The user has then made a note 802 about the claim possibly being fraudulent based on the social media post 800. Notably, this action by the user has taken several forms, from a circle gesture over a specific portion of the social media post 800, to a line drawn from the circle, to alphanumeric input ("fraudulent?"). The MagicPad interface 300 is able to interpret this combination of symbolic and alphanumeric input into a definable query/action (add the suspicion of fraud to the claim report). Notably, since it appears that Peter was not wearing his glasses at the time of the accident, presuming that Peter was indeed driving the car that caused the accident, Peter may be at fault, no matter what story the adjuster had been told by Peter and others.

Figure 9:
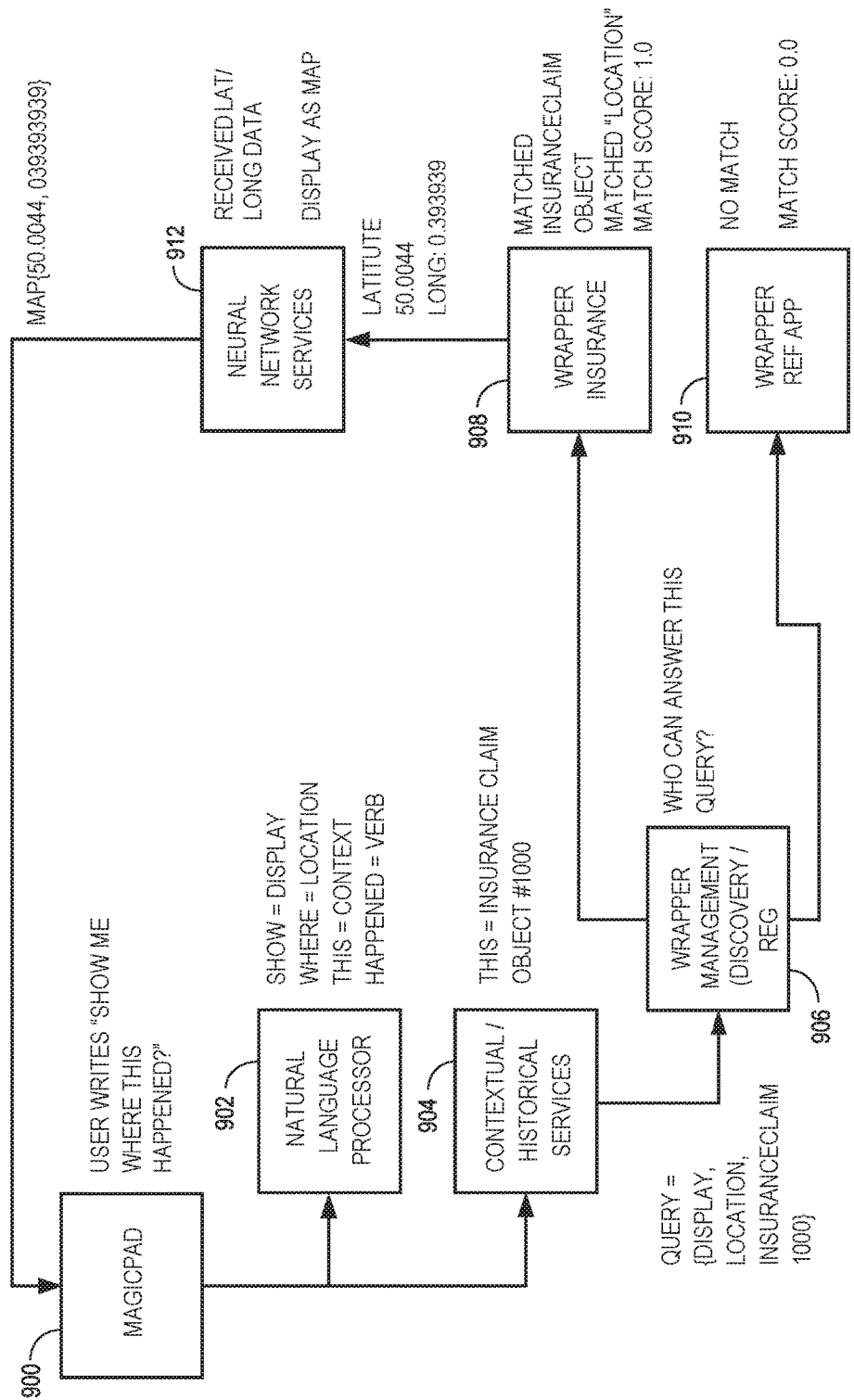
FIG. 9 is a flow diagram illustrating a process flow for a MagicPad interface, in accordance with an example embodiment.

FIG. 9 is a flow diagram illustrating a process flow for a MagicPad interface 900, in accordance with an example embodiment. The MagicPad interface 900 receives an input from the user, here "Show me where this happened?" This is passed to a natural language processor 902, which parses the query into multiple tokens and classifies the tokens. Here, the token "Show" is classified as a command to display, the token "where" is classified as a location, "this" is classified as context, and "happened" is classified as a verb.

Contextual/historical services 904 identifies that the contextual item "this" corresponds to an insurance claim with object #1000. A semantic model of the user query (display, location, insurance claim #1000) is then generated and sent to a wrapper management component 906. The wrapper management component 906 then attempts to determine which service can answer the query. It tests both wrapper insurance 908 and a wrapper reference app 910, matching the wrapper insurance 908 because the wrapper insurance 908 corresponds to a service having a semantic model of service that includes an input including display, location, and an identified insurance claim object. The corresponding insurance service then provides the location in insurance claim #1000 to the wrapper insurance 908, which passes this location to neural network services 912. Neural network services 912 takes this location information, and through machine learning techniques has learned to return a map from a map server depicting the location, which it does, and returns the map to the MagicPad interface 900.

As described above, the MagicPad system may rely on one or more machine learning models to accurately predict query meaning and service selection. Specifically, as described above, a Bayes Classifier-based neural network can be used for each of these purposes.

A neural network is a type of machine learning model inspired by biological neural networks that is used to estimate or approximate functions that can depend on a large number of inputs. The system takes a large number of sample inputs, also known as training data, and then develops a system that can learn from those sample inputs. There are many different types of neural networks that may be utilized for purposes of implementation of the MagicPad interface.

Some embodiments described herein provide a method and an apparatus for detection of relationships between objects in a semantic network. Semantic objects and semantic relations are generated from a semantic network. The semantic relations are based on connections between the semantic objects. A neural network is integrated with the semantic objects and the semantic relations to generate a contextual network. A statistical analysis of the connections among the semantic objects in the contextual network is performed to identify stronger semantic relations. The identified stronger semantic relations are used to update the neural network.

As used herein, a "semantic network" may refer to a network of semantic objects connected through semantic relations. A "semantic object," as used herein, may refer to a conceptual representation of a notion recognized by service, such as an action, term, verb, or any other suitable data. A "semantic relation," as used herein, may refer to a relationship between two or more semantic objects. Such relationships may have attributes and a type or definition that provides a conceptual meaning to how the two or more semantic objects are related to each other.

"Semantic information," as used herein, may refer to information that provides conceptual meaning to data. Such semantic information may associate particular data with concepts maintained by a service. For example, a collection of attributes (e.g., street, city, state, zip code, and the like) may be given a meaning (e.g., location). Such semantic information may be formally organized as "semantic object definitions" and "semantic relation definitions."

Figure 10:
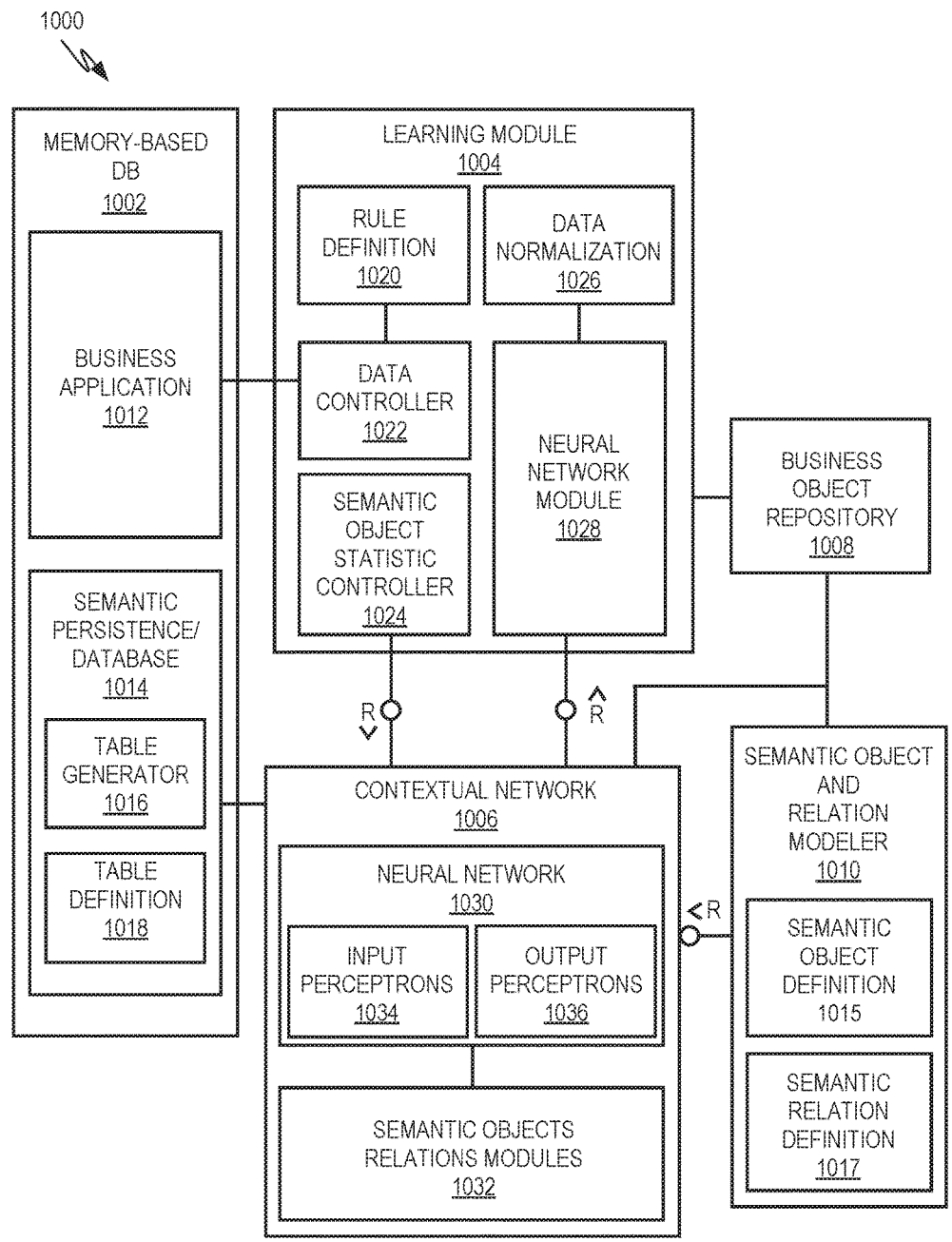
FIG. 10 is a block diagram depicting an architectural overview of a learnable contextual network system for semantic objects in a semantic network, in accordance with an example embodiment.

FIG. 10 is a block diagram depicting an architectural overview of a learnable contextual network system 1000 for semantic objects in a semantic network, in accordance with an example embodiment.

The learnable contextual network system 1000 includes a memory-based database 1002, a learning module 1004, a contextual network 1006, a business object repository 1008, and a semantic object and relation modeler 1010. The learning module 1004, the contextual network 1006, and the semantic object and relation modeler 1010 may be embodied, individually or in combination, in a computing device in the form of, for example, a personal computer, a server computer, or any other suitable computing device. In various embodiments, the computing device may be used to implement computer programs, logic, applications, methods, processes, or software to determine existing relationships between objects in a semantic network using information, as described in more detail below.

In one embodiment, the memory-based database 1002 includes a business application 1012 and a semantic persistence/database 1014. The memory-based database 1002 includes, for example, SAP HANA DB from SAP, SE, a German company. The memory-based database 1002 may be used by the business application 1012.

The semantic persistence/database 1014 is configured to store a table generator 1016 and a table definition 1018. For example, the table generator 1016 may be configured to generate tables used as storage for information (data and metadata) used by a contextual network (e.g., persistence for semantic objects and relations), neural network configuration data (e.g., configuration data describing input and output perceptrons), and training data—data used by the end-user to train a particular neural network (e.g., calculated prediction data).

The contextual network 1006 integrates a neural network 1030 in addition to a semantic network that includes a semantic objects/relations module 1032, which provide meaning to particular data.

As described above, the semantic objects/relations module 1032 stored in the contextual network 1006 may be based, in part, on semantic object definitions 1015 and semantic relation definitions 1017 of the semantic object and relation modeler 1010. Such semantic information provides supplemental meaning to the elements, attributes, and relations between the objects.

In some embodiments, to assist a user in creating the semantic object definition 1015 and the semantic relation definition 1017, the semantic object and relation modeler 1010 may extract existing definitions stored in the business object repository 1008. Once the definitions are extracted from the business object repository 1008, the semantic object and relation modeler 1010 may be configured to provide, for example, a user interface to a user so that the user can model such definitions in a way that gives semantic meaning to the business objects.

The semantic object and relation modeler 1010 may be configured to send the semantic object definition 1015 and the semantic relation definition 1017 to the contextual network 1006 (for example, in particular to the semantic objects/relations module 1032). In turn, the semantic objects/relations module 1032 may generate rule definitions.

As described above, the contextual network 1006 may store relations with data. In some embodiments, the contextual network 1006 may receive the data through a text analyzer and/or handwriting analyzer (not shown). The text analyzer is configured to extract data from data sources and export objects and relations to the contextual network 1006.

Elements of the contextual network graph include semantic objects and semantic relations (relations between particular semantic objects) that allow defining semantically particular terms, concepts, and the like (any kind of object that encapsulates some data and/or functionality). The semantic relation is an object that defines the link type, its importance (source weight-authority), direction (simple/bi-directional), and the like.

The neural network 1030 is integrated with the semantic object and its elements. In other words, input and output perceptrons 1034 and 1036 do not feed to the neural network 1030, which can be understood as a "parallel" defined neural network module 1028 that supports integration of the learning module 1004 with the memory-based database 1002 and the creation and calculation of neural network (speeds-up the learning process of neural network module 1028 and creates and calculates a neural network 1030. The newly created network is then automatically integrated into the contextual network 1006 and exposed for usage by the user.

The particular semantic object and its elements can be used as the integration or anchor point to many input and/or output perceptrons 1034 and 1036. This means that the contextual network 1006 supports "multi-layering" of the neural network that may depict different aspects of functionality.

The learning module 1004 allows the calculation of dependencies between particular elements The learning module 1004 comprises rule definition 1020, a data controller 1022, a semantic object statistic controller 1024, data normalization 1026, and the neural network module 1028.

The rule definition 1020 defines how the existing data in memory can be combined to build particular input parameters. The data normalization 1026 is a module that automatically normalizes the input data and is mainly used to simplify the learning calculation of the neural network.

The data controller 1022 is a module that controls the access to the data (a different controller may be used to access other memory based databases) and transfers the required data in memory to and from the memory-based database 1002. The read action is related to data (e.g., input and output parameters) used in the learning phase and also to simulation/prediction input data in productive usage. The write operation is related to output parameters in productive usage that are then stored in separate tables. The tables may be generated by the table generator 1016 on the fly and reflect the input and output parameters of the network(s).

The neural network module 1028 creates and calculates a neural network that represents the relations between particular elements. The configuration of the network may involve defining a few initial parameters (e.g., network type (supervised/non-supervised), network architecture (hidden layers, etc.), and used optimization method (e.g., usage of back-propagation or other methods)).

The semantic object statistic controller 1024 allows the statistical analysis of the existing connections/links between particular semantic objects.

Figure 11:
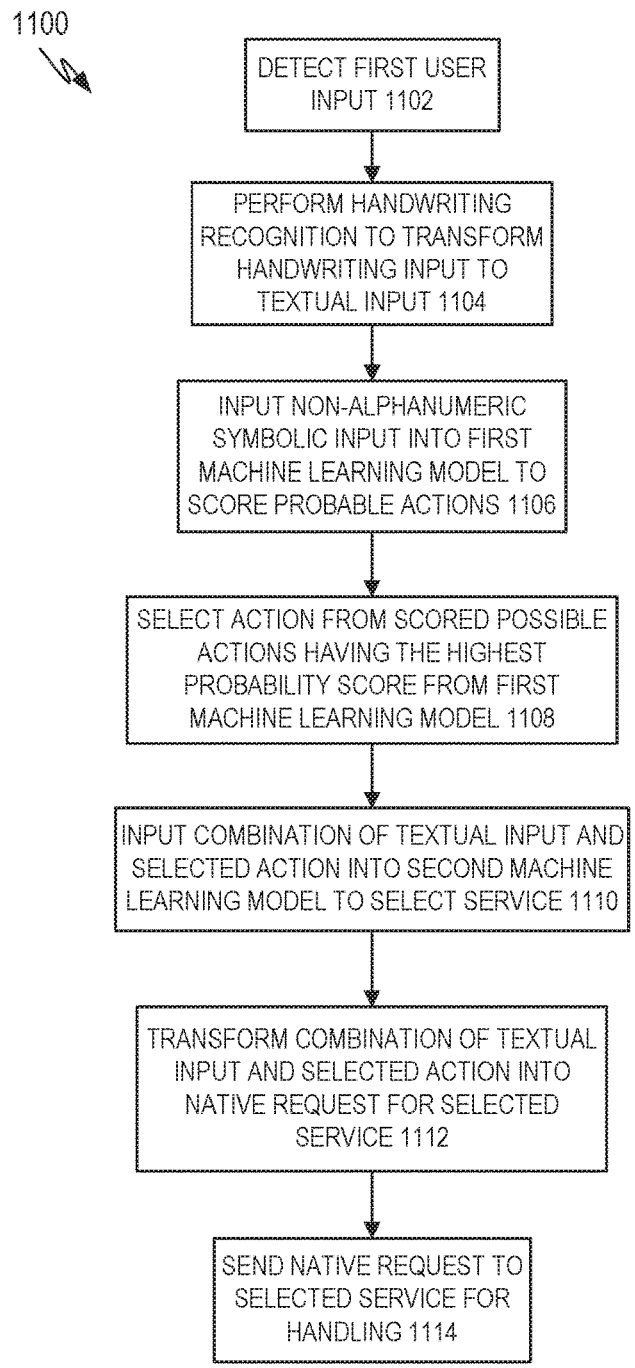
FIG. 11 is a flow diagram illustrating a method, in accordance with an example embodiment, of handling user input in a graphical user interface.

FIG. 11 is a flow diagram illustrating a method 1100, in accordance with an example embodiment, of handling user input in a graphical user interface. At operation 1102, first user input is detected. This first user input may include a combination of handwriting input and non-alphanumeric input. The handwriting input may be input by a user via an input mechanism that resembles using a pen or pencil on paper, such as, for example, touchscreen input detecting the user's finger or a stylus.

At operation 1104, the handwriting input is transformed into textual input using handwriting recognition. In some example embodiments, the handwriting recognition may be implemented using a machine learning model trained to recognize the user's handwriting. This machine learning model may be designed and trained separately from the other machine learning models described in this disclosure. In an example embodiment, the machine learning algorithm used for the handwriting recognition may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, information bottleneck method, and neural networks.

At operation 1106, the non-alphanumeric symbolic input is input into a first machine learning model trained to output a set of possible actions corresponding to non-alphanumeric symbolic input and a probability score assigned to each action in the set of possible actions. The probability score may be a score measuring the likelihood that the user intended to invoke the corresponding action. This first machine learning model may be designed and trained separately from the other machine learning models described in this disclosure. In an example embodiment, the machine learning algorithm used to train the first machine learning model may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, information bottleneck method, and neural networks. In an example embodiment, a Bayes Classifier-based neural network is utilized to train the first machine learning model, using one or more features extracted from the non-alphanumeric symbolic input. Features from other inputs may also be extracted, including personalization features capturing features from input that is specific to the current user of the GUI, such as past non-alphanumeric symbolic input and subsequent actions taken by this current user, and a user profile.

At operation 1108, the action having the highest probability score is selected from the scored possible actions from the first machine learning model. It should be noted that embodiments are foreseen where this operation is performed by either the first machine learning model or by the GUI itself.

At operation 1110, a combination of the textual input and the selected action is input into a second machine learning model trained to select a service from a plurality of services based on the textual input and to select the selected action by referencing a service model corresponding to each service in the plurality of services. Specifically, the second machine learning model may be coupled to a plurality of different semantic models of services, each semantic model of service defining how the corresponding service is used, its domain, and its construction, and containing one or more native requests for the corresponding service.

This second machine learning model may be designed and trained separately from the other machine learning models described in this disclosure. In an example embodiment, the machine learning algorithm used to train the second machine learning model may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, information bottleneck method, and neural networks. In an example embodiment, a Bayes Classifier-based neural network is utilized to train the second machine learning model, using one or more features extracted from the combination of the textual input and the selected action. Features from other inputs may also be extracted, including personalization features capturing features from input that is specific to the current user of the GUI, such as past non-alphanumeric symbolic input and subsequent actions taken by this current user, and a user profile.

Different variations of the second machine learning model are possible, outputting different information. Specifically, in one example embodiment, the second machine learning model is designed to score the various possible services available for the textual input and the selected action and output these scores. In such an embodiment, the GUI may then select the service having the highest score. In another example embodiment, the second machine learning model selects the service having the highest score and outputs this selected service. In other example embodiments, the second machine learning model may also be trained to score the different possible specific native requests in the possible services. Likewise, in some embodiments these scores may be output to the GUI for selection of the specific native request having the highest score, or the second machine learning model may perform the selection and output the native request having the highest score to the GUI. In such embodiments, the second machine learning model may base the selection of the native request on a set of input parameters defined in the service model for the corresponding service.

At operation 1112, the combination of textual input and the selected action is transformed into a native request for the selected service. At operation 1114, the native request is sent to the selected service for handling.

Figure 12:
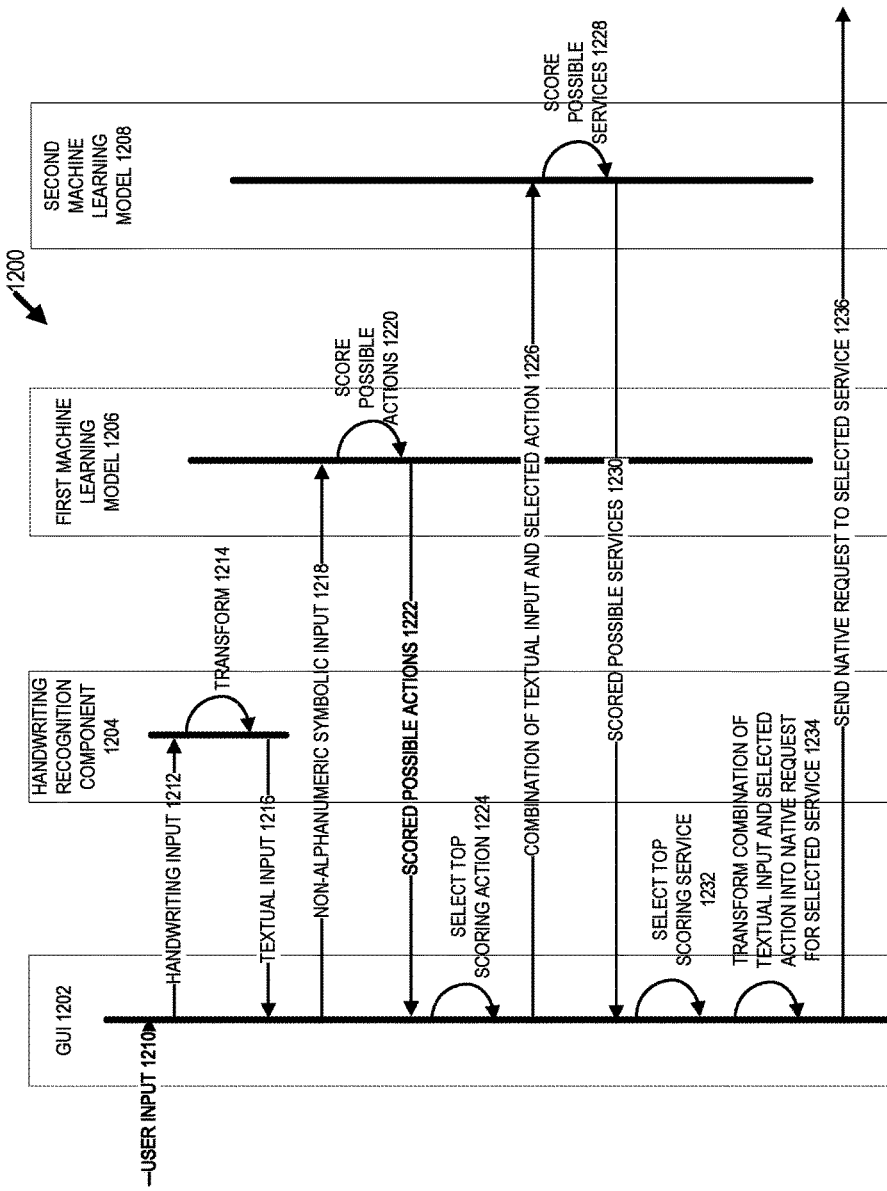
FIG. 12 is an interaction diagram illustrating a method, in accordance with an example embodiment, of handling user input.

FIG. 12 is an interaction diagram illustrating a method 1200, in accordance with an example embodiment, of handling user input. This method 1200 utilizes a GUI 1202, a handwriting recognition component 1204, a first machine learning model 1206, and a second machine learning model 1208. At operation 1210, user input is received by the GUI 1202. At operation 1212, handwriting input of the user input is sent to the handwriting recognition component 1204, which transforms it into textual input at operation 1214 and sends the textual input back to the GUI 1202 at operation 1216.

At operation 1218, non-alphanumeric symbolic input of the user input is sent to the first machine learning model 1206, which scores possible actions corresponding to the non-alphanumeric symbolic input at operation 1220 and returns the scored possible actions at operation 1222. The first machine learning model 1206 is described in more detail above with respect to FIG. 11 and, for brevity, this description will not be repeated here.

At operation 1224, the GUI 1202 selects the top scoring action, and at operation 1226 sends a combination of the textual input and the selected action to the second machine learning model 1208. The second machine learning model 1208 scores possible services at operation 1228 and returns the scored possible services at operation 1230. The second machine learning model 1208 is described in more detail above with respect to FIG. 11 and, for brevity, this description will not be repeated here.

At operation 1232, the GUI 1202 selects the top scoring service, and at operation 1234 transforms the combination of textual input and the selected action into a native request for the selected service. At operation 1236, the GUI 1202 sends the native request to the selected service.

EXAMPLES

Example 1

A system comprising:
an operating system executed by a hardware processor;
a handwriting recognition component configured to perform handwriting recognition on handwriting input to transform the handwriting input into textual input;
a first machine learning model trained to output a set of possible actions corresponding to non-alphanumeric symbolic input and a probability score assigned to each action in the set of possible actions, the probability score indicating a likelihood that a user intended to invoke the corresponding action;
a second machine learning model trained to select a service from a plurality of services based on the textual input and a selected action by referencing a service model corresponding to each service in the plurality of services; and
a graphical user interface configured to:
  detect first user input, the first user input including the handwriting input and the non-alphanumeric symbolic input;
  pass the handwriting input to the handwriting recognition component to transform the handwriting input into the textual input;
  input the non-alphanumeric symbolic input into the first machine learning model;
  select an action in the set of possible actions output by the first machine learning model having a highest probability score;
  input a combination of the textual input and the selected action into the second machine learning model;
  transform the combination of the textual input and the selected action into a native request for the selected service based on a service model for the selected service; and
  send the native request to the selected service for handling by the selected service.

Example 2

The system of Example 1, wherein the non-alphanumeric symbolic input includes gesture-based input.

Example 3

The system of Example 1, wherein the non-alphanumeric symbolic input includes a drawing made by the user via the graphical user interface.

Example 4

The system of Example 1, wherein the non-alphanumeric symbolic input includes circling an object rendered in the graphical user interface and connecting the circled object to the handwriting input.

Example 5

The system of Example 1, wherein the second machine learning model is coupled to a plurality of different semantic models of services, each semantic model of a service defining how the corresponding service is used, its domain, and its construction, and containing one or more native requests for the corresponding service.

Example 6

The system of any of Examples 1-5, wherein each of the one or more native requests has a set of input parameters, and wherein the second machine learning model is further trained to output a selected native request for the selected service based on the set of input parameters for the selected native request.

Example 7

The system of any of Examples 1-6, wherein each of the plurality of services is located on a different data source.

Example 8

A method comprising:
detecting first user input, the first user input including handwriting input and non-alphanumeric symbolic input;

transforming the handwriting input into textual input;

inputting the non-alphanumeric symbolic input into a first machine learning model trained to output a set of possible actions corresponding to the non-alphanumeric symbolic input and a probability score assigned to each action in the set of possible actions, the probability score indicating a likelihood that a user intended to invoke the corresponding action;

selecting an action in the set of possible actions output by the first machine learning model having a highest probability score;

inputting a combination of the textual input and the selected action into a second machine learning model trained to select a service from a plurality of services based on the textual input and the selected action by referencing a service model corresponding to each service in the plurality of services;

transforming the combination of the textual input and the selected action into a native request for the selected service based on a service model for the selected service; and sending the native request to the selected service for handling by the selected service.

Example 9

The method of Example 8, wherein the non-alphanumeric symbolic input includes gesture-based input.

Example 10

The method of Example 8, wherein the non-alphanumeric symbolic input includes a drawing made by the user via a graphical user interface.

Example 11

The method of Example 8, wherein the non-alphanumeric symbolic input includes circling an object rendered in a graphical user interface and connecting the circled object to the handwriting input.

Example 12

The method of any of Example 9-11, wherein the second machine learning model is coupled to a plurality of different semantic models of services, each semantic model of a service defining how the corresponding service is used, its domain, and its construction, and containing one or more native requests for the corresponding service.

Example 13

The method of any of Examples 9-12, wherein each of the one or more native requests has a set of input parameters, and wherein the second machine learning model is further trained to output a selected native request for the selected service based on the set of input parameters for the selected native request.

Example 14

The method of any of Examples 9-13, wherein each of the plurality of services is located on a different data source.

Example 15

A non-transitory machine-readable storage medium comprising instructions which, when implemented by one or more machines, cause the one or more machines to perform operations comprising:

detecting first user input, the first user input including handwriting input and non-alphanumeric symbolic input;

transforming the handwriting input into textual input;

inputting the non-alphanumeric symbolic input into a first machine learning model trained to output a set of possible actions corresponding to the non-alphanumeric symbolic input and a probability score assigned to each action in the set of possible actions, the probability score indicating a likelihood that a user intended to invoke the corresponding action;

selecting an action in the set of possible actions output by the first machine learning model having a highest probability score;

inputting a combination of the textual input and the selected action into a second machine learning model trained to select a service from a plurality of services based on the textual input and the selected action by referencing a service model corresponding to each service in the plurality of services;

transforming the combination of the textual input and the selected action into a native request for the selected service based on a service model for the selected service; and sending the native request to the selected service for handling by the selected service.

Example 16

The non-transitory machine-readable storage medium of Example 15, wherein the non-alphanumeric symbolic input includes gesture-based input.

Example 17

The non-transitory machine-readable storage medium of Example 15, wherein the non-alphanumeric symbolic input includes a drawing made by the user via a graphical user interface.

Example 18

The non-transitory machine-readable storage medium of Example 15, wherein the non-alphanumeric symbolic input includes circling an object rendered in a graphical user interface and connecting the circled object to the handwriting input.

Example 19

The non-transitory machine-readable storage medium of any of Examples 16-18, wherein the second machine learning model is coupled to a plurality of different semantic models of services, each semantic model of a service defining how the corresponding service is used, its domain, and its construction, and containing one or more native requests for the corresponding service.

Example 20

The non-transitory machine-readable storage medium of any of Examples 16-19, wherein each of the one or more native requests has a set of input parameters, and wherein the second machine learning model is further trained to output a selected native request for the selected service based on the set of input parameters for the selected native request.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-12 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 13:
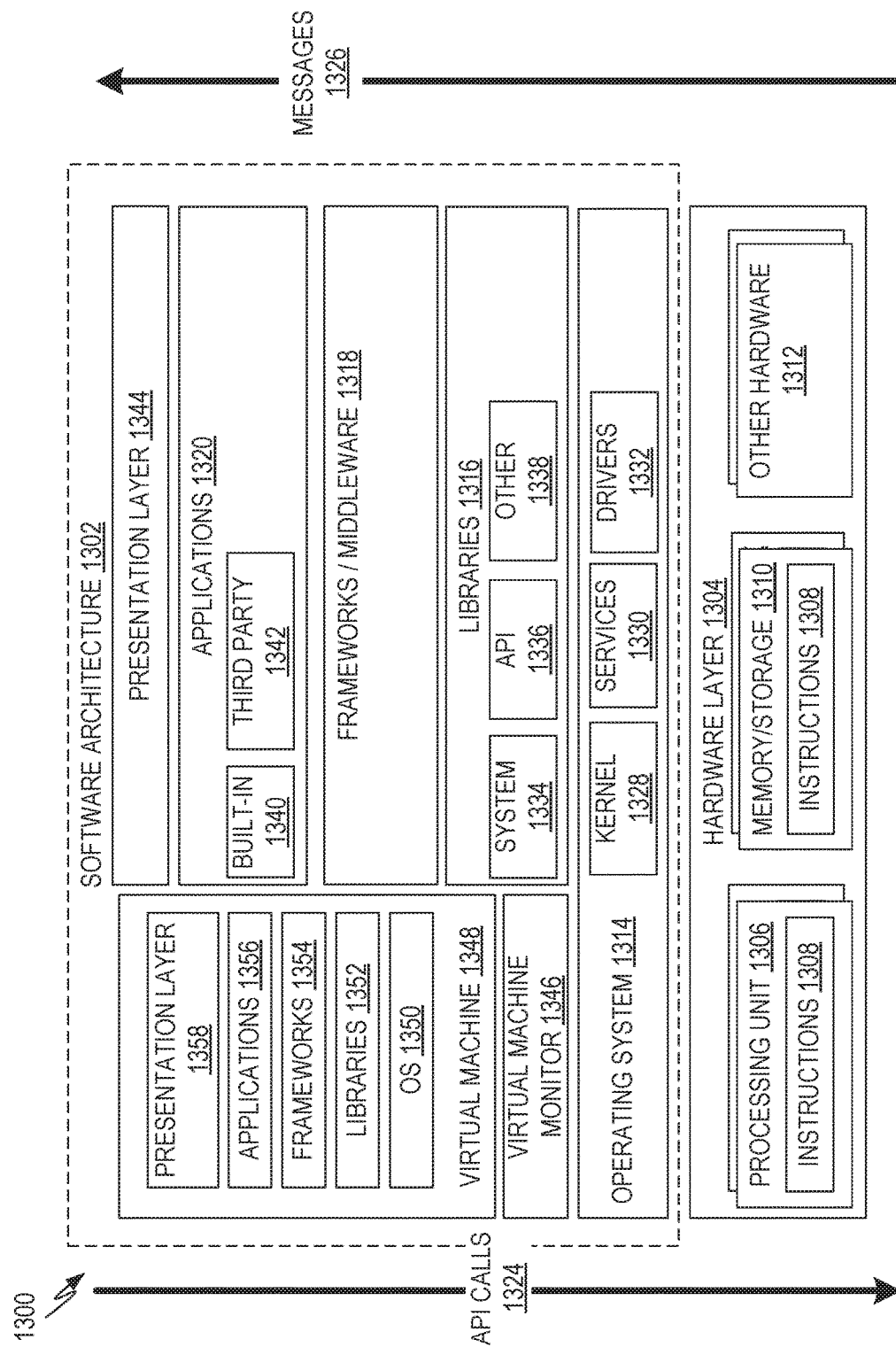
FIG. 13 is a block diagram illustrating a representative software architecture, which may be used in conjunction with various hardware architectures herein described.

FIG. 13 is a block diagram 1300 illustrating a representative software architecture 1302, which may be used in conjunction with various hardware architectures herein described. FIG. 13 is merely a non-limiting example of a software architecture 1302, and it will be appreciated that many other architectures may be implemented to facilitate the functionality described herein. The software architecture 1302 may be executing on hardware such as a machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. The executable instructions 1308 represent the executable instructions of the software architecture 1302, including implementation of the methods, modules, and so forth of FIGS. 1-12. The hardware layer 1304 also includes memory and/or storage modules 1310, which also have the executable instructions 1308. The hardware layer 1304 may also comprise other hardware 1312, which represents any other hardware of the hardware layer 1304, such as the other hardware illustrated as part of the machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320, and a presentation layer 1344. Operationally, the applications 1320 and/or other components within the layers may invoke API calls 1324 through the software stack and receive a response, returned values, and so forth illustrated as messages 1326 in response to the API calls 1324. The layers illustrated are representative in nature, and not all software architectures have all layers. For example, some mobile or special purpose operating systems may not provide a frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330, and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks/middleware 1318 may provide a higher-level common infrastructure that may be utilized by the applications 1320 and/or other software components/modules. For example, the frameworks/middleware 1318 may provide various GUI functions, high-level resource management, high-level location services, and so forth. The frameworks/middleware 1318 may provide a broad spectrum of other APIs that may be utilized by the applications 1320 and/or other software components/modules, some of which may be specific to a particular operating system 1314 or platform.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. The third-party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1342 may invoke the API calls 1324 provided by the mobile operating system such as the operating system 1314 to facilitate functionality described herein.

The applications 1320 may utilize built-in operating system functions (e.g., kernel 1328, services 1330, and/or drivers 1332), libraries (e.g., system libraries 1334, API libraries 1336, and other libraries 1338), and frameworks/middleware 1318 to create user interfaces to interact with users of the system. Alternatively, or additionally, in some systems, interactions with a user may occur through a presentation layer, such as the presentation layer 1344. In these systems, the application/module "logic" can be separated from the aspects of the application/module that interact with a user.

Some software architectures utilize virtual machines. In the example of FIG. 13, this is illustrated by a virtual machine 1348. The virtual machine 1348 creates a software environment where modules and applications 1320 can execute as if they were executing on a hardware machine (such as the machine 1400 of FIG. 14, for example). The virtual machine 1348 is hosted by a host operating system (operating system 1314 in FIG. 13) and typically, although not always, has a virtual machine monitor 1346, which manages the operation of the virtual machine 1348 as well as the interface with the host operating system (e.g., operating system 1314). A software architecture executes within the virtual machine 1348, such as an operating system 1350, libraries 1352, frameworks/middleware 1354, applications 1356, and/or a presentation layer 1358. These layers of software architecture executing within the virtual machine 1348 can be the same as corresponding layers previously described or may be different.

Example Machine Architecture and Machine-Readable Medium

Figure 14:
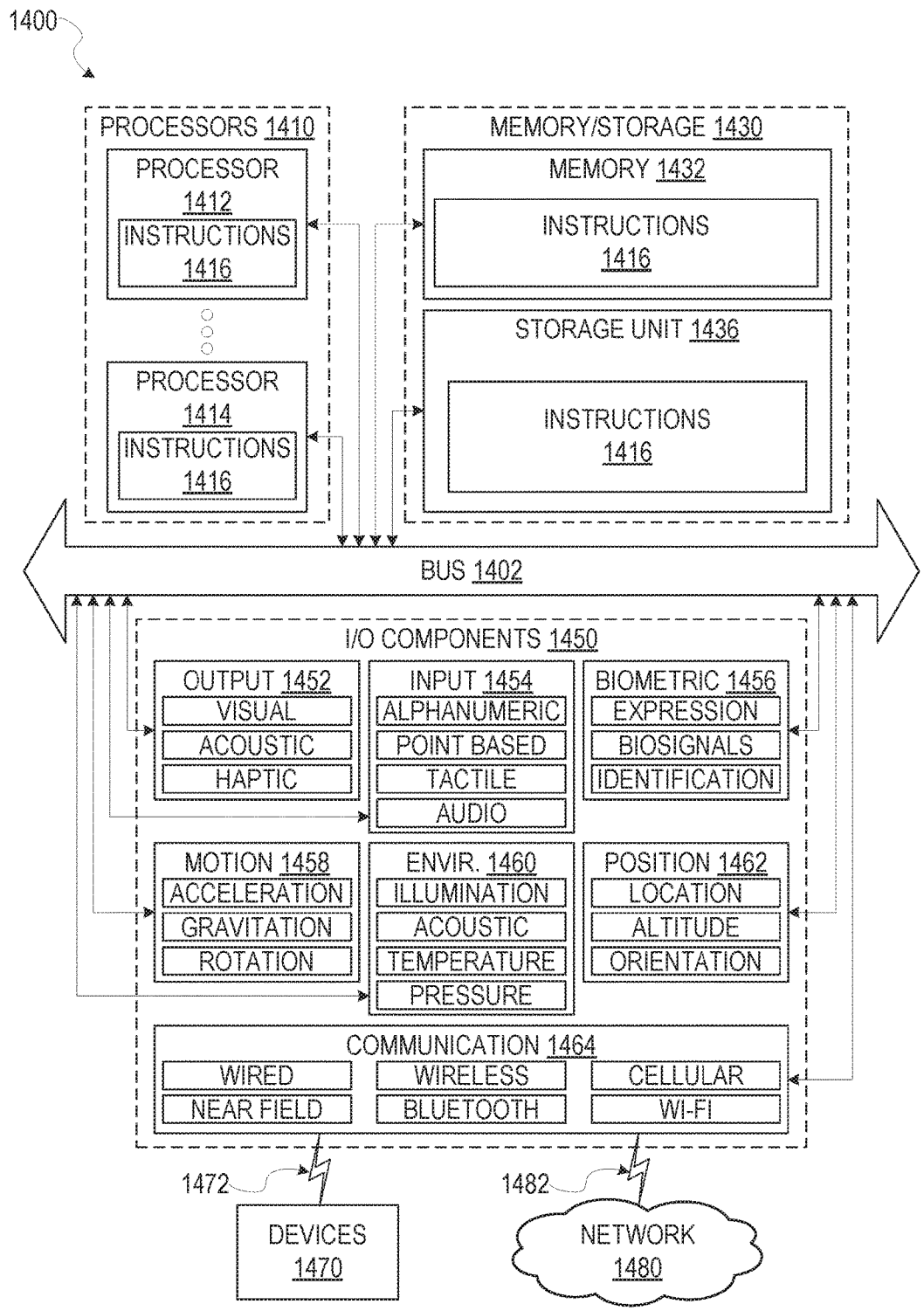
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions 1416 from a machine-readable medium (e.g., a machine-readable storage medium) and perform any one or more of the methodologies discussed herein. Specifically, FIG. 14 shows a diagrammatic representation of the machine 1400 in the example form of a computer system, within which the instructions 1416 (e.g., software, a program, an application 1320, an applet, an app, or other executable code) for causing the machine 1400 to perform any one or more of the methodologies discussed herein may be executed. For example, the instructions 1416 may cause the machine 1400 to execute the flow diagrams of FIGS. 9 and 11. Additionally, or alternatively, the instructions 1416 may implement modules of FIGS. 2 and 10, and so forth. The instructions 1416 transform the general, non-programmed machine 1400 into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1412 and a processor 1414 that may execute the instructions 1416. The term "processor" is intended to include a multi-core processor 1412, 1414 that may comprise two or more independent processors 1412, 1414 (sometimes referred to as "cores") that may execute the instructions 1416 contemporaneously. Although FIG. 14 shows multiple processors 1410, the machine 1400 may include a single processor 1412, 1414 with a single core, a single processor 1412, 1414 with multiple cores (e.g., a multi-core processor 1412, 1414), multiple processors 1412, 1414 with a single core, multiple processors 1412, 1414 with multiple cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor 1412, 1414's cache memory), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store the instructions 1416 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine (e.g., processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine 1400 will depend on the type of machine 1400. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion, and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472 respectively. For example, the communication components 1464 may include a network interface component or other suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A device comprising:
  an operating system executed by a hardware processor,
  a graphical user interface component, when executing on the operating system, configured to detect a first user input including both handwriting input and non-alphanumeric symbolic input, the non-alphanumeric symbolic input referencing at least a portion of the handwriting input;
  a handwriting recognition component, when executing on the operating system, configured to perform handwriting recognition on the handwriting input to transform the handwriting input into a textual input;
  a first machine learning model, when executing on the operating system, trained to output a set of possible actions corresponding to the non-alphanumeric symbolic input and a probability score assigned to each action in the set of possible actions, the probability score indicating a likelihood that a user intended to invoke the corresponding action;
  a second machine learning model, when executing on the operating system, trained to select a service from a plurality of services based on the textual input and a selected action by referencing a service model corresponding to each service in the plurality of services, wherein the second machine learning model is a neural network; and
  the graphical user interface component configured to:
  display a selection of an action in the set of possible actions output by the first machine learning model having a highest probability score;
  input a combination of the textual input and the selected action into the second machine learning model;
  transform the combination of the textual input and the selected action into a native request for the selected service based on a service model for the selected service, the native request capable of being processed by the selected service without transformation; and
  send the native request to the selected service for handling by the selected service.

2. The system of claim 1, wherein the non-alphanumeric symbolic input includes gesture-based input.

3. The system of claim 1, wherein the non-alphanumeric symbolic input includes a drawing made by the user via the graphical user interface.

4. The system of claim 1, wherein the non-alphanumeric symbolic input includes circling an object rendered in the graphical user interface and connecting the circled object to the handwriting input.

5. The system of claim 1, wherein the second machine learning model is coupled to a plurality of different semantic models of services, each semantic model of a service defining how the corresponding service is used, its domain, and its construction, and containing one or more native requests for the corresponding service.

6. The system of claim 5, wherein each of the one or more native requests has a set of input parameters, and wherein the second machine learning model is further trained to output a selected native request for the selected service based on the set of input parameters for the selected native request.

7. The system of claim 1, wherein each of the plurality of services is located on a different data source.

8. A method comprising:
  detecting first user input, the first user input including both a handwriting input and a non-alphanumeric symbolic input, the non-alphanumeric symbolic input referencing at least a portion of the handwriting input;
  transforming the handwriting input into textual input;
  inputting the non-alphanumeric symbolic input into a first machine learning model trained to output a set of possible actions corresponding to the non-alphanumeric symbolic input and to output a probability score assigned to each action in the set of possible actions, the probability score indicating a likelihood that a user intended to invoke the corresponding action;
  selecting an action in the set of possible actions output by the first machine learning model having a highest probability score;
  inputting a combination of the textual input and the selected action into a second machine learning model trained to select a service from a plurality of services based on the textual input and the selected action by referencing a service model corresponding to each service in the plurality of services, wherein the second machine learning model is a neural network;
  transforming the combination of the textual input and the selected action into a native request for the selected service based on a service model for the selected service, the native request capable of being processed by the selected service without transformation; and sending the native request to the selected service for handling by the selected service.

9. The method of claim 8, wherein the non-alphanumeric symbolic input includes gesture-based input.

10. The method of claim 8, wherein the non-alphanumeric symbolic input includes a drawing made by the user via a graphical user interface.

11. The method of claim 8, wherein the non-alphanumeric symbolic input includes circling an object rendered in a graphical user interface and connecting the circled object to the handwriting input.

12. The method of claim 8, wherein the second machine learning model is coupled to a plurality of different semantic models of services, each semantic model of a service defining how the corresponding service is used, its domain, and its construction, and containing one or more native requests for the corresponding service.

13. The method of claim 12, wherein each of the one or more native requests has a set of input parameters, and wherein the second machine learning model is further trained to output a selected native request for the selected service based on the set of input parameters for the selected native request.

14. The method of claim 8, wherein each of the plurality of services is located on a different data source.

15. A non-transitory machine-readable storage medium comprising instructions which, when implemented by one or more machines, cause the one or more machines to perform operations comprising:

detecting first user input, the first user input including both handwriting input and non-alphanumeric symbolic input, the non-alphanumeric symbolic input referencing at least a portion of the handwriting input;

transforming the handwriting input into textual input;

inputting the non-alphanumeric symbolic input into a first machine learning model trained to output a set of possible actions corresponding to the non-alphanumeric symbolic input and a probability score assigned to each action in the set of possible actions, the probability score indicating a likelihood that a user intended to invoke the corresponding action;

selecting an action in the set of possible actions output by the first machine learning model having a highest probability score;

inputting a combination of the textual input and the selected action into a second machine learning model trained to select a service from a plurality of services based on the textual input and the selected action by referencing a service model corresponding to each service in the plurality of services, wherein the second machine learning model is a neural network;

transforming the combination of the textual input and the selected action into a native request for the selected service based on a service model for the selected service, the native request capable of being processed by the selected service without transformation; and sending the native request to the selected service for handling by the selected service.

16. The non-transitory machine-readable storage medium of claim 15, wherein the non-alphanumeric symbolic input includes gesture-based input.

17. The non-transitory machine-readable storage medium of claim 15, wherein the non-alphanumeric symbolic input includes a drawing made by the user via a graphical user interface.

18. The non-transitory machine-readable storage medium of claim 15, wherein the non-alphanumeric symbolic input includes circling an object rendered in a graphical user interface and connecting the circled object to the handwriting input.

19. The non-transitory machine-readable storage medium of claim 15, wherein the second machine learning model is coupled to a plurality of different semantic models of services, each semantic model of a service defining how the corresponding service is used, its domain, and its construction, and containing one or more native requests for the corresponding service.

20. The non-transitory machine-readable storage medium of claim 19, wherein each of the one or more native requests has a set of input parameters, and wherein the second machine learning model is further trained to output a selected native request for the selected service based on the set of input parameters for the selected native request.

* * * * *